United States Patent
Critsinelis et al.

(10) Patent No.: US 9,303,795 B2
(45) Date of Patent: Apr. 5, 2016

(54) PIPE-IN-PIPE APPARATUS INCLUDING AN ENGINEERED PIPE

(71) Applicants: Antonio C. F. Critsinelis, Kingwood, TX (US); Christopher A. Kassner, Houston, TX (US); Sid A. Mebarkia, Sugar Land, TX (US)

(72) Inventors: Antonio C. F. Critsinelis, Kingwood, TX (US); Christopher A. Kassner, Houston, TX (US); Sid A. Mebarkia, Sugar Land, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 14/055,056

(22) Filed: Oct. 16, 2013

(65) Prior Publication Data
US 2014/0116556 A1 May 1, 2014

Related U.S. Application Data

(60) Provisional application No. 61/720,006, filed on Oct. 30, 2012.

(51) Int. Cl.
*F16L 9/00* (2006.01)
*F16L 9/19* (2006.01)
*F16L 59/14* (2006.01)
*F16L 9/18* (2006.01)
*F16L 39/00* (2006.01)

(52) U.S. Cl.
CPC ... *F16L 9/19* (2013.01); *F16L 9/18* (2013.01); *F16L 9/20* (2013.01); *F16L 39/005* (2013.01); *F16L 59/143* (2013.01); *Y10T 29/49428* (2015.01)

(58) Field of Classification Search
CPC .................................... F16L 11/20; F16L 9/19
USPC .................................. 138/114, 148, 149, 109
See application file for complete search history.

(56) References Cited

U.S. PATENT DOCUMENTS

| | | | |
|---|---|---|---|
| 4,700,751 A * | 10/1987 | Fedrick | 138/149 |
| 5,713,423 A | 2/1998 | Martin | |
| 5,813,106 A | 9/1998 | Haug | |
| 5,868,437 A * | 2/1999 | Teague | 285/45 |
| 5,996,643 A * | 12/1999 | Stonitsch | 138/143 |

(Continued)

FOREIGN PATENT DOCUMENTS

| | | |
|---|---|---|
| NL | 7208376 | 12/1973 |
| WO | 2014003539 | 1/2014 |

OTHER PUBLICATIONS

PCT Notification of Transmittal of the International Search Report and the Written Opinion of the International Searching Authority, or the Declaration; regarding PCT/US2013/065278 dated Jan. 16, 2014 (12 pages).

*Primary Examiner* — Patrick F Brinson
(74) *Attorney, Agent, or Firm* — Melissa Patangia

(57) ABSTRACT

Disclosed is a pipe-in-pipe apparatus comprising an inner pipe disposed within an outer pipe wherein the inner pipe is an engineered pipe or umbilical. The outer pipe will shield the inner pipe. As a result, the design of the inner pipe only needs to address the functions required for the engineered pipe-in-pipe apparatus. The end fittings of the system are designed for enabling maximum operation and intervention flexibility. The engineered pipe-in-pipe apparatus will allow longer sections of the inner pipe to be used which will reduce the amount of field fabrication and streamline the installation process. The apparatus may be used for both new piping systems as well as the updating or retrofitting of an existing onshore or offshore piping system.

15 Claims, 6 Drawing Sheets

(56) References Cited

U.S. PATENT DOCUMENTS

| | | |
|---|---|---|
| 6,142,359 A | 11/2000 | Corbishley |
| 6,556,780 B2 * | 4/2003 | Mjelstad et al. ............. 392/469 |
| 2002/0122664 A1 * | 9/2002 | Mjelstad et al. ............. 392/478 |
| 2009/0145506 A1 | 6/2009 | Queau |
| 2009/0159144 A1 * | 6/2009 | Dixon-Roche ................. 138/33 |

\* cited by examiner

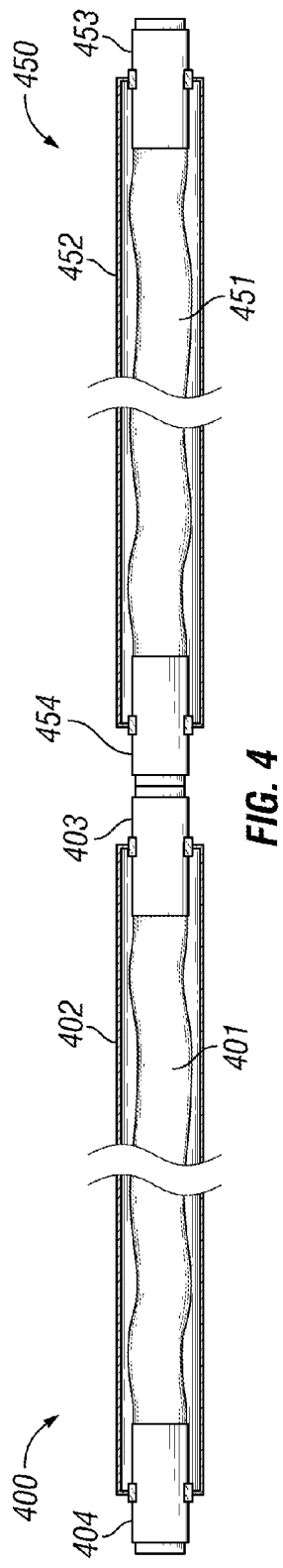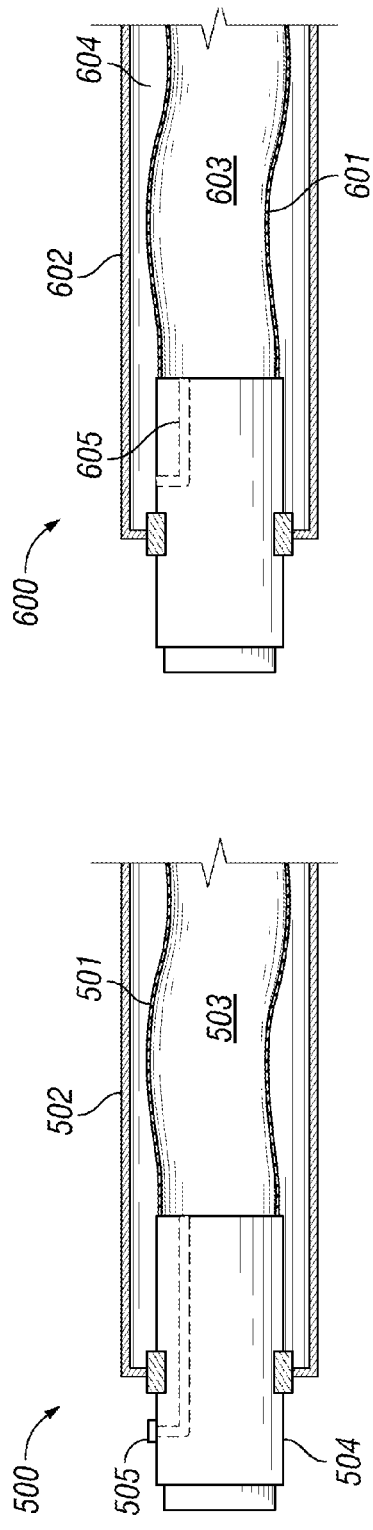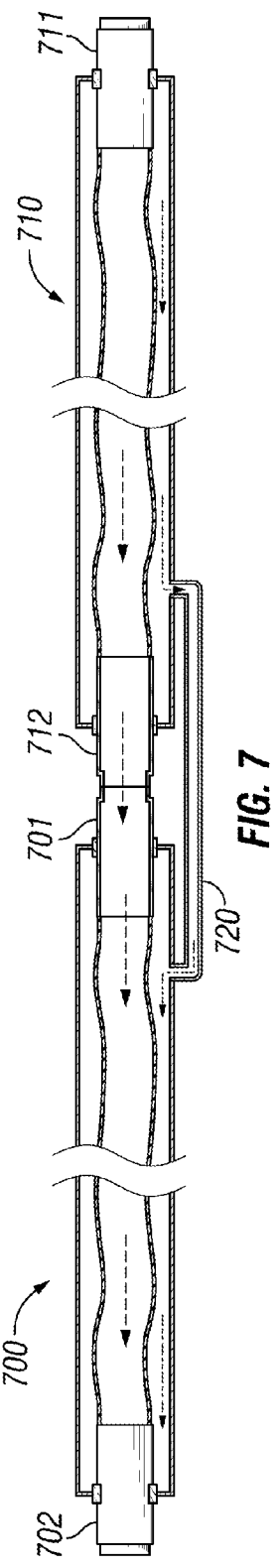

PIPE-IN-PIPE APPARATUS INCLUDING AN ENGINEERED PIPE

CROSS-REFERENCE TO RELATED APPLICATIONS

This application claims benefit under 35 U.S.C. §119 of U.S. Provisional Patent Application No. 61/720,006 with a filing date of Oct. 30, 2012. This application claims priority to and benefits from the foregoing, the disclosure of which is incorporated by reference.

FIELD OF THE INVENTION

This invention relates to pipe-in-pipe apparatus for conveying fluids comprising an inner pipe disposed within an outer pipe. In particular, this invention relates to such apparatus wherein the inner pipe is an engineered pipe, for example, a flexible pipe.

BACKGROUND OF THE INVENTION

In subsea hydrocarbon production systems, it is common practice to adopt configurations, which are effective in fulfilling several important operational objectives including, but not limited to, flow assurance, operating flexibility and reliability, while also enabling swift and safe fabrication and installation. Such systems also require means of maintaining steady state production, and mitigating critical operational situations such as emergency and planned shut downs, start ups and blockages to flow in production lines that may hinder or cease production. Systems are needed which prevent, intervene, or correct undesirable conditions such as slugging and blockage by hydrates or other solids within production lines. Several existing methodologies and technologies are utilized to maintain flow in production lines, including, but not limited to, the following: thermal insulation, heating, pigging, gas lift, displacement of production fluids, chemicals, coiled tubing intervention into production lines, circulation of hot fluids, de-pressurization of production lines, slug catchers, and well testing.

In subsea hydrocarbon production, components such as risers, flowlines, and jumpers, are frequently used to convey hydrocarbon products from a subsea well to a topsides production platform, vessel or tieback to an onshore plant facility. These components typically are steel pipes or engineered pipes.

Engineered pipes can be fabricated in a number of different configurations. For example, engineered pipes can be bonded or unbonded flexible pipe. In addition, engineered pipes can be composite pipes designed and manufactured with metallic and/or non-metallic materials such as steel, thermoplastic, plastic, elastomers, carbon fiber, polymeric compounds, fiber glass, ceramic compounds and the like. Engineered pipes can be formed as a single layer or multiple layers with each layer designed for a specific function, providing the engineered pipe with special characteristics such as corrosion resistance, lower flexural stiffness, thermal insulation, tensile strength, collapse strength, pressure containment, or abrasion resistance. Engineered pipes are often terminated in devices commonly called end fittings, which acts as a housing to wrap, secure, anchor, and/or seal all the layers and also provide interface connections with other pipe sections, subsea structures, and/or topsides piping.

One example of an engineered pipe comprises an innermost layer (or carcass layer) of unbonded flexible pipe made of corrosion resistant material, designed to resist collapse of the flexible pipe. The carcass layer is surrounded by another polymeric sealant layer or pressure sheath which is extruded around the carcass layer and sealed at flexible pipe end fittings to contain fluid within the bore. Surrounding the polymeric sealant layer is an annulus containing a number of metallic layers designed to impart strength against tensile loading and internal pressure loading. Surrounding these layers is another polymeric sealant layer or external sheath designed to avoid external sea water ingress into inner layers of the flexible pipe, which acts as an outer protective layer.

Another example of engineered pipe comprises a bonded flexible pipe made up of layers of non-metallic materials such as elastomers or polymers, either wrapped or extruded individually and bonded together through the use of adhesives or by applying heat or pressure or a combination of thereof to fuse and bond the layers in to a single wall construction.

A composite pipe is another example of an engineered pipe. This type of pipe may comprise of one layer or multiple layers of non-metallic materials such as thermoplastic, plastic, elastomeric, carbon fiber, polymeric compounds, fiber glass, ceramic compounds and the like. These materials may individually exist in engineered pipe or they may be combined and/or fused together during the manufacturing process to form various composite hybrid materials.

Engineered pipe can also be devised with additional features such as heat tracing. Heat tracing provides active heating by electric cables, which are integrated and bundled into the engineered pipe structure to improve the thermal performance of the system. Engineered pipe can also be devised with fiber optic cable for sensing, process monitoring, and integrity monitoring and data transmission.

A pipe system including a pipe-in-pipe (PIP) apparatus may be utilized to provide enhanced thermal performance in subsea hydrocarbon production components such as flowlines, risers, and jumpers. A typical PIP apparatus includes an inner steel pipe disposed within an outer steel pipe with an annular space between the inner surface of the outer pipe wall and the outer surface of the inner pipe wall. Materials with high insulation properties typically present low (poor) external pressure resistance. The configuration of the PIP apparatus allows the use of these high insulation materials in the annulus between the two pipes because the outer pipe shields the external hydrostatic pressure from the annulus thus protecting the insulation material from damage and degradation. In some applications the PIP has empty and interconnected annular space to allow the flow of fluids through both the inner bore and the annulus space.

However, there are challenges associated with the design of a conventional pipe system using a PIP apparatus. For example, this system requires an increased amount of field fabrication due to the requirement to weld and assemble two pipe strings (inner and outer pipes). In addition, there are other challenges including, but not limited to, large thermal expansion effects and the risk of buckling the materials and connections; low cycle-high stress fatigue loading; corrosion problems with the inner pipe and outer which is exposed to the transported fluids and/or seawater; concerns regarding the integrity of the system when subject to installation loads and the risk of structural failure; the design of bulkheads associated with the PIP apparatus which need to allow both for quick field assembly and also to provide isolation and structural strength; and non-desired electrical continuity between the outer pipe and the inner pipe. Further, an external leak, which will lead to a flooded annulus, can undermine the system performance if not properly contained or limited. It would be desirable to provide a way to address the challenges associated with the conventional PIP apparatus in which both the outer pipe and the inner pipe are made of steel.

SUMMARY OF THE INVENTION

According to one embodiment, a pipe-in-pipe apparatus including an inner engineered pipe is disclosed. The apparatus includes an inner engineered pipe disposed within an outer pipe or carrier pipe (engineered pipe-in-pipe or EIP). In one embodiment, the inner engineered pipe is a flexible pipe.

Like a pipe-in-pipe (PIP) apparatus, the EIP apparatus will provide (among other features) both high thermal performance and multiple flow paths through bore and annulus or interchangeably between them. In addition, the inner engineered pipe of the EIP apparatus will be shielded by the outer pipe and therefore, the inner engineered pipe can be designed to address the functions required for the EIP apparatus. The inner engineered pipes will be terminated in devices called end fittings.

The inner engineered pipe of the EIP apparatus can be comprised of any of the known engineered pipes including, but not limited to, the following examples: (1) an engineered pipe comprising an innermost layer (or carcass layer) of unbonded flexible pipe made of corrosion resistant material, designed to resist collapse of the flexible pipe surrounded by another polymeric sealant layer or pressure sheath which is extruded around the carcass layer and sealed at flexible pipe end fittings to contain fluid within the bore; (2) an engineered pipe comprising a bonded flexible pipe made up of layers of non-metallic materials such as elastomers or polymers, either wrapped or extruded individually and bonded together through the use of adhesives or by applying heat or pressure or a combination of thereof to fuse and bond the layers in to a single wall construction; and (3) a composite pipe comprising of one layer or multiple layers of non-metallic materials such as thermoplastic, plastic, elastomeric, carbon fiber, polymeric compounds, fiber glass, ceramic compounds and the like.

The inner engineered pipe and its end fittings will have the ability to absorb thermal expansion created by the high pressure and high temperature of the flowing production fluids. Because the inner engineered pipe has the ability to move (for example, to expand, to contract, or to deflect) inside the outer pipe, the risk of buckling the materials is reduced. The inner engineered pipe will also provide enhanced resistance to fatigue loading due to its construction (single layer or multiple layers) and associated mechanical characteristics. In addition, the inner engineered pipe will provide resistance to corrosion from transported fluid. Moreover the inner engineered pipe can better negotiate curves and bends inside the outer pipe. The outer pipe can also act as a stabilizer for the inner engineered pipe and avoid undesired movement of the flowline due to effect of environmental loading (current and waves). The outer pipe can be a protective barrier against mud flow typically seen in canyon crossings and scarp crossings. The outer pipe can also be a protective barrier for burying the flowline and against trawl boarding impacts. As the outer pipe can be made either of steel or engineered pipe, all the above properties and benefits listed for the inner pipe can also be captured in the outer pipe as required.

In another embodiment, the EIP apparatus can be either designed as an original installation or can be a retrofit of an existing pipe system. In the retrofit embodiment, the inner engineered pipe can be added or introduced for repair, remediation, upgrade or enhancement purposes of the existing pipe.

During the design of the pipe system, the length of each individual section of inner engineered pipe is selected to optimize the pipe system design in terms of installation requirements, leak containment, inner engineered pipe packaging, and cost optimization for the pipe system. The configuration of the EIP apparatus allows an optimized installation for jumpers, risers, and flowlines in subsea applications as it combines both engineered pipe and pipe-in-pipe technologies.

The inner engineered pipe is terminated in devices called as end fitting. The end fittings are designed to provide smooth interface between pipe sections, to enable quick connection and disconnection onshore (during manufacturing) and offshore. Optionally, the end fittings also can act as an interface and point of access for functionalities such as bore and annulus (EIP apparatus annulus and/or inner engineered pipe bore) access for operations including, but not limited to, chemical injection, gas lift, flow by pass, process monitoring, integrity monitoring, intervention, inspection, fluid sampling and repair. The end fittings can also act as connection point (station) for direct electrical heating or heat tracing or optical cable. Annular communications between EIP apparatus segments may also be achieved by interlink piping.

In highly corrosive and/or sour service environments the annular space between the inner engineered pipe and outer pipe could also be used to convey corrosion/sour service inhibitors which may facilitate a form of corrosion mitigation in some forms of inner engineered pipe when combined with intentional (or unintentional) breaches in their external sheath.

In another embodiment, the EIP apparatus can also comprise an umbilical contained inside the outer pipe. An umbilical is typically composed of a variety of components such as electric cables, fiber optics, hydraulic tube (steel or thermoplastic), and power cable. The variety of components can be independent, bundled or combined.

BRIEF DESCRIPTION OF THE DRAWINGS

The description is presented with reference to the accompanying figure in which:

FIG. 4 illustrates two sections of one embodiment of the engineered pipe-in-pipe apparatus.

FIG. 5 illustrates one embodiment of the end fitting of the inner engineered pipe of the engineered pipe-in-pipe apparatus.

FIG. 6 illustrates one embodiment of the end fitting of the inner engineered pipe of the engineered pipe-in-pipe apparatus.

FIG. 7 illustrates two sections of one embodiment of the engineered pipe-in-pipe apparatus, wherein the annulus of each section is inter-connected.

FIGS. 7A-7D illustrate points of external access via the controllable redirecting means.

DETAILED DESCRIPTION OF THE INVENTION

In one embodiment, an engineered pipe-in-pipe apparatus has an inner engineered pipe disposed within an outer pipe (the EIP apparatus). In one embodiment the inner engineered pipe is a flexible pipe. The outer pipe or carrier pipe may be an outer steel pipe or may be an outer engineered pipe. The outer pipe will shield the inner engineered pipe. As a result, the design of the inner engineered pipe only needs to address the functions required for the EIP apparatus.

An engineered pipe is typically terminated at each end by an end fitting which incorporates a rigid connection for mating with other connections. With the EIP apparatus, the end fitting configuration of the inner engineered pipe becomes simpler as a result of the simplified design of the inner engineered pipe. The end fitting is designed to ensure that its dimensions and profile allow easy and quick field integration of the inner engineered pipe inside the outer pipe.

Figure 1:
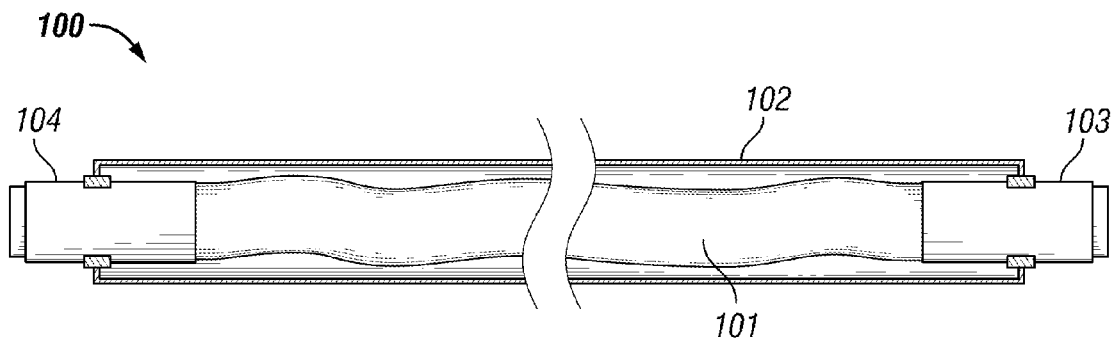
FIG. 1 illustrates one embodiment of the engineered pipe-in-pipe apparatus.

FIG. 1 illustrates one embodiment of the engineered pipe-in-pipe apparatus 100. An inner engineered pipe 101 is disposed within an outer pipe 102. The inner engineered pipe 101 is terminated at each end by an end fitting as illustrated by right end fitting 103 and left end fitting 104. In one embodiment, the outer pipe 102 is a steel pipe and the inner engineered pipe 101 is a flexible pipe.

Figure 2:
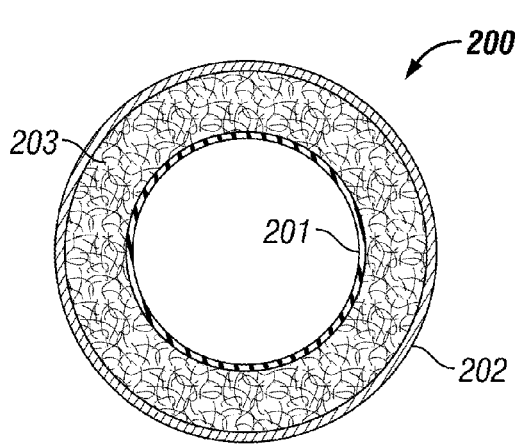
FIG. 2 illustrates a cross-sectional view of the engineered pipe-in-pipe apparatus.
Figure 2A:
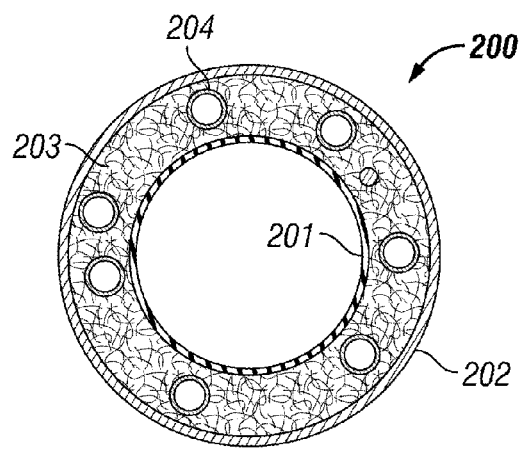
FIG. 2A illustrates a cross-sectional view of another embodiment of the engineered pipe-in-pipe apparatus wherein components are disposed in the annulus of the engineered pipe-in-pipe apparatus.

FIG. 2 illustrates a cross-sectional view of another embodiment of the engineered pipe-in-pipe apparatus 200. An inner engineered pipe 201 is disposed within an outer pipe 202. The inner engineered pipe 201 is designed to convey fluids such as hydrocarbons. The space between the outer wall of the inner engineered pipe 201 and the inner wall of the outer pipe 202 is the annulus 203 of the engineered pipe-in-pipe apparatus. In one embodiment, insulation occupies the annulus. In another embodiment, the annulus 203 can be void for fluids flow circulation. In another embodiment as shown in FIG. 2A, the annulus 203 can contain a variety of components 204 including, but not limited to, electric cables, fiber optics, hydraulic tube (steel or thermoplastic), power cable, heat trace (electric, steam, hot fluid), gas lift lines, scale squeeze lines, methanol lines, or MEG lines.

Figure 3:
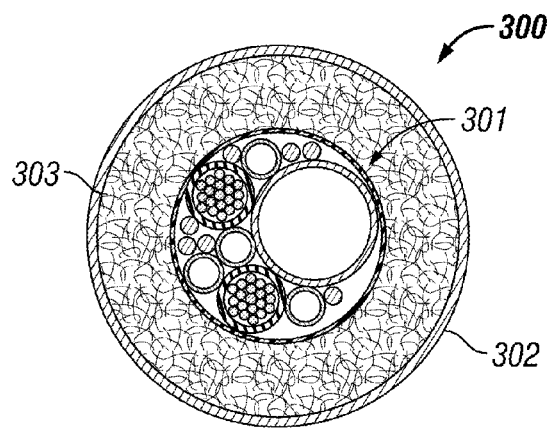
FIG. 3 illustrates one embodiment of the engineered pipe-in-pipe apparatus wherein an umbilical or a bundle of components are disposed within an outer pipe.

FIG. 3 illustrates a cross-sectional view of another embodiment of the EIP apparatus 300. An umbilical 301 is disposed within an outer pipe 302. As is known in the art, the umbilical 301 may be composed of a variety of components including, but not limited to, electric cables, fiber optics, hydraulic tube (steel or thermoplastic) and power cable. The components can be independent, bundled or combined. Instead of an umbilical, a bundle of components may also be disposed within the outer pipe 302.

FIG. 4 illustrates two sections (or stalks) of one embodiment of the engineered pipe-in-pipe apparatus. In a first section 400, a first inner engineered pipe 401 is disposed within a first outer pipe 402. The first inner engineered pipe 401 is terminated at each end by an end fitting as illustrated by first right end fitting 403 and first left end fitting 404. In a second section 450, a second inner engineered pipe 451 is disposed within a second outer pipe 452. The second inner engineered pipe 451 is terminated at each end by an end fitting as illustrated by second right end fitting 453 and second left end fitting 454. First right end fitting 403 and second left end fitting 454 are connected together to join first section 400 and second section 450. A pipe system incorporating the EIP apparatus will include one single section or a plurality of sections of the EIP apparatus. The first outer pipe 402 and the second outer pipe 452 can be continuous. In addition, the first inner engineered pipe 401 and the second inner engineered pipe 451 can be continuous.

The end fitting can be configured to provide a smooth interface between pipe sections or stalks, to enable quick connection and disconnection onshore and offshore. In addition, the end fitting also act as an interface and point of access for functionalities such as bore or annulus access for operations such as chemical injection, gas lift, flow by pass, process monitoring, integrity monitoring, intervention, fluid sampling, inspection and repair. The end fitting can also act as connection point (station) for electrical heating or heat tracing or optical cable.

FIG. 5 illustrates a partial section of one embodiment of the engineered pipe-in-pipe apparatus 500. An inner engineered pipe 501 is disposed within an outer pipe 502. The space inside the inner engineered pipe 501 is the pipe bore 503. The inner engineered pipe 501 is terminated at the left end by a left end fitting 504. In one embodiment of the left end fitting 504 of the inner engineered pipe 501 includes an access 505 to the pipe bore 503.

FIG. 6 illustrates a partial section of one embodiment of the engineered pipe-in-pipe apparatus 600. An inner engineered pipe 601 is disposed within an outer pipe 602. The space inside the inner engineered pipe 601 is the pipe bore 603. The space between the outer wall of the inner engineered pipe 601 and the inner wall of the outer pipe 602 is the annulus 604 of the EIP apparatus. In one embodiment, the EIP apparatus is designed to allow access 605 between the pipe bore 603 and the annulus 604.

FIG. 7 illustrates two sections of one embodiment of the engineered pipe-in-pipe apparatus. A first section 700 of the EIP apparatus is terminated at each end by an end fitting as illustrated by first right end fitting 701 and first left end fitting 702. A second section 710 of the EIP apparatus is terminated at each end by an end fitting as illustrated by second right end fitting 711 and second left end fitting 712. First right end fitting 701 and second left end fitting 712 are connected together to join first section 700 and second section 710. Annular communication between a first section 700 and a second section 710 may also be achieved by interlink piping 720. The interlink piping 720 can be external or incorporated into the design of the end fitting.

Figure 7A:
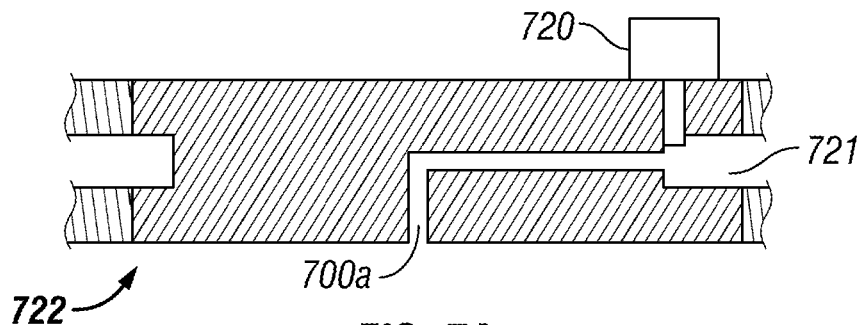
FIGS. 7A-7D illustrate various configurations for establishing fluid flow along the annulus of the engineered pipe-in-pipe apparatus and between the annulus and the pipe bore. In addition.
Figure 7B:
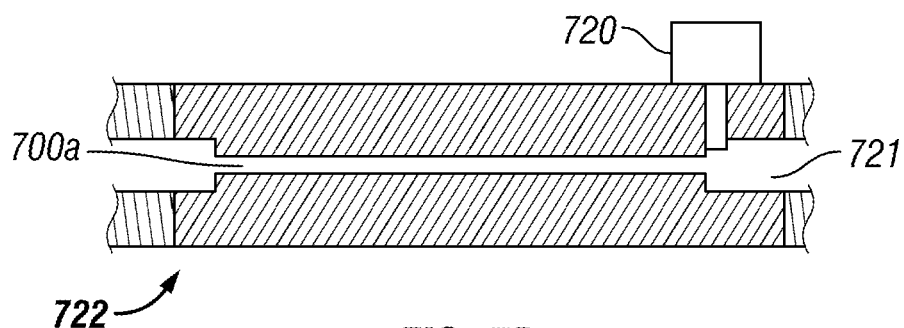
Figure 7C:
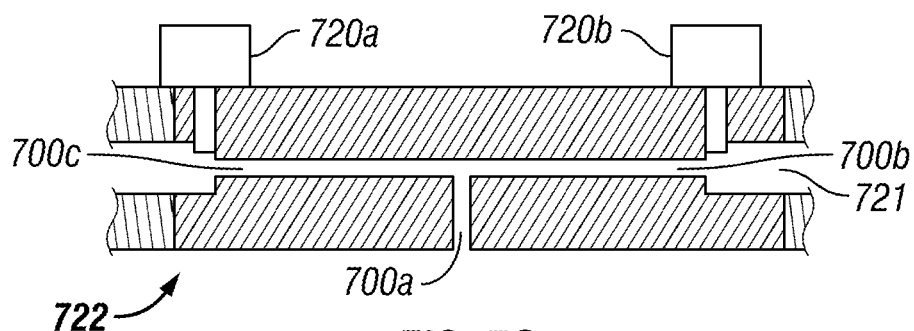
Figure 7D:
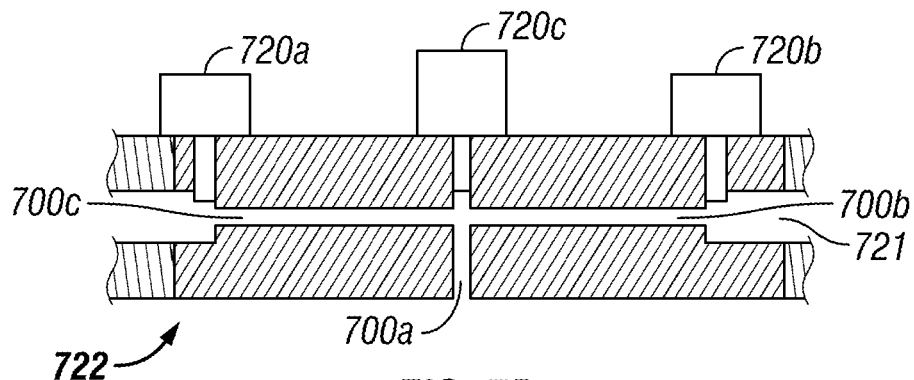
Figure 8:
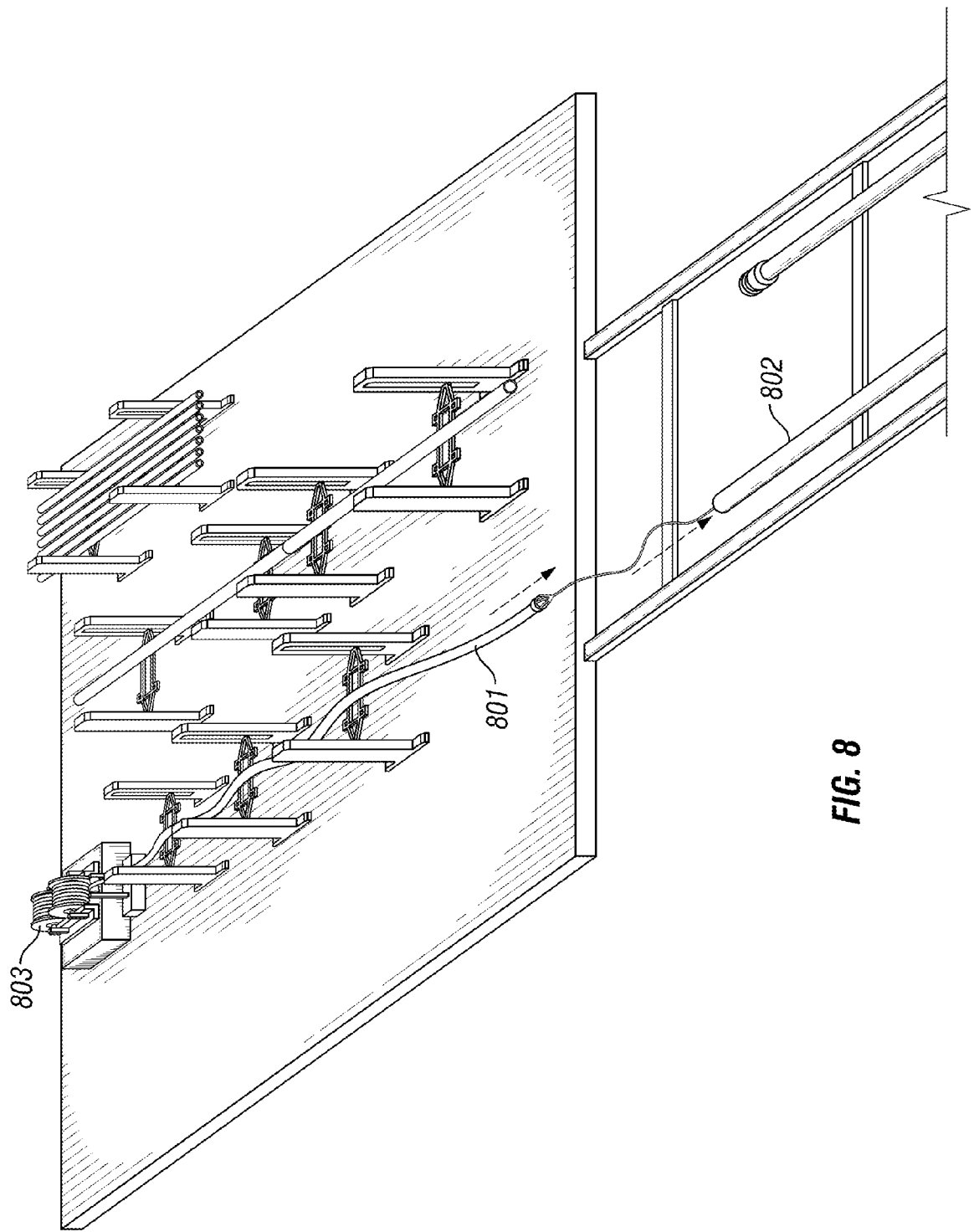
FIG. 8 illustrates one embodiment of the yard fabrication and assembly of the engineered pipe-in-pipe apparatus.

FIGS. 7A-7D illustrate various configurations for establishing fluid flow along the annulus 721 of the engineered pipe-in-pipe apparatus and between the annulus 721 and the pipe bore 722. In addition, FIGS. 7A-7D illustrate points of external access via controllable redirecting means in the end fitting. An external agent (for example, an ROV, AUV, or divers) could operate (open, close, redirect flow) the controllable redirecting means. The flow paths are represented by 700a, 700b and 700c. In FIG. 7A, controllable redirecting means 720 is operated to control fluid flow between the annulus 721 and the pipe bore 722 via passage 700a. In FIG. 7B, control means 720 is operated to control fluid flow between adjacent sections or segments of the annulus 721 of the engineered pipe-in-pipe apparatus via passage 700a. In FIG. 7C, controllable redirecting means 720a and 720b are operated to control fluid flow in four ways: (1) through passages 700a, 700b and 700c to establish fluid communication between the pipe bore 722 and the annular 721 (in either/both axial directions), (2) through passages 700*a* and 700*b* to establish fluid communication between the pipe bore 722 and the annulus 721 in one axial direction, (3) through passages 700*a* and 700*c* to establish fluid communication between the pipe bore 722 and the annulus 721 in the opposite axial direction, and (4) through passages 700*b* and 700*c* to establish fluid communication between adjacent segments of the annulus 721. Controllable redirecting means 720*a* and 720*b* could alternatively be a single mechanism. The possible flow path options are applicable regardless of actuating mechanism associated with the controllable redirecting means. In FIG. 7D, an additional controllable redirecting means 720*c* provides a further flow path in fluid communication with an external fluid source (not shown). All control mechanisms noted previously in this document can be envisioned to control flow between adjacent segments of the annulus. FIG. 8 illustrates one embodiment of the fabrication and assembly of the engineered pipe-in-pipe apparatus. During the design of the pipe system incorporating the EIP apparatus, the length of each individual section of inner engineered pipe is selected to optimize the pipe system design in terms of installation requirements, leak containment, inner pipe packaging, and cost optimization for the pipe system. The EIP apparatus will allow longer sections of the inner engineered pipe to be used which will reduce the amount of field fabrication and connections. The inner engineered pipe can be supplied in sections, reels, or carousels which will reduce project space and logistics requirements in addition to reducing fabrication and installation costs. For example, the EIP apparatus may be reeled onto Reel Ships and may also have the potential for horizontal and vertical lay methods (J-lay and S-lay applications). The stalk (or section) lengths are defined by the length of continuous engineered pipe or by fabrications restrictions or limitations. The inner engineered pipe 801 can be pulled into the outer pipe 802 from the reels 803. The plurality of stalks can be joined (stalk-to-stalk connection) at the end fitting connections.

For the J-lay pipelay method, the pipeline sections are first fabricated onshore. Such sections consist of welding multiple pipeline joints together depending on the selected installation vessel configuration. A pipeline joint is typically 12.3 m (40 ft). The inner engineered pipe can be pulled into the onshore fabricated sections and terminated by end fittings. The ready sections are then transported offshore on the installation vessel or on a supply vessel. The inner engineered pipes are first connected together followed by connecting the end fittings followed by connecting (welding or mechanical connector) of the outer pipes to make up the EIP sections and proceed with the J-lay installation.

For the S-lay pipelay method, the pipeline sections are prepared ahead of time off critical path in single joints, or multiple joints depending on the selected installation vessel configuration. The inner engineered pipe can be pulled into the fabricated sections and terminated by end fittings. The inner engineered pipes are first connected together followed by welding or mechanical connection of the outer pipes to make up the EIP sections and proceed with the S-lay installation.

In another embodiment of the EIP apparatus, due to the fact that the inner engineered pipe and the outer pipe can be electrically isolated, the EIP apparatus can be designed to have a direct electrical heating system (DEH).

The inner engineered pipe can also be used to add features including, but not limited to, the following: electrical heating, fiber optical cable, or a direct electrical heating station, in which an external agent (for example, ROV, AUV, or divers) could make a connection of external cable for energizing and/or interconnecting the system as required.

Figure 9:
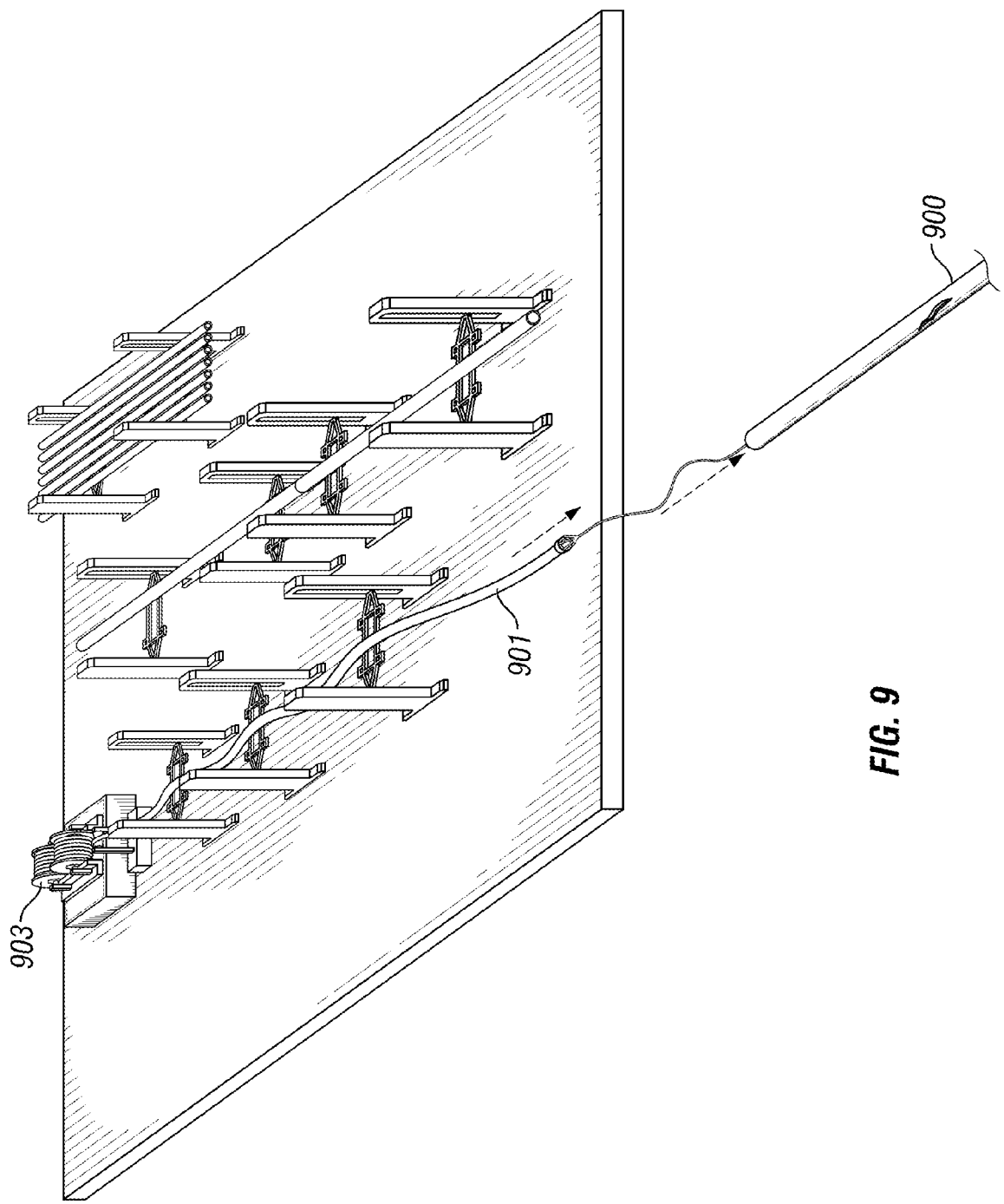
FIG. 9 illustrates one embodiment of retrofitting an existing onshore piping system with the engineered pipe-in-pipe apparatus.
Figure 9A:
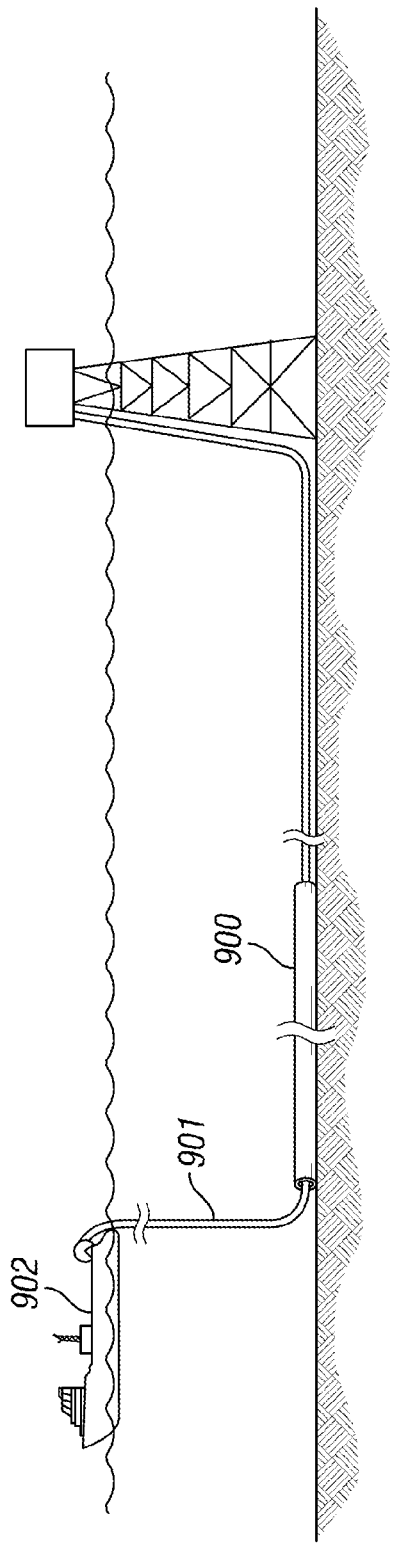
FIGS. 9A and 9B illustrate embodiments of retrofitting existing offshore piping systems with the engineered pipe-in-pipe apparatus.
Figure 9B:
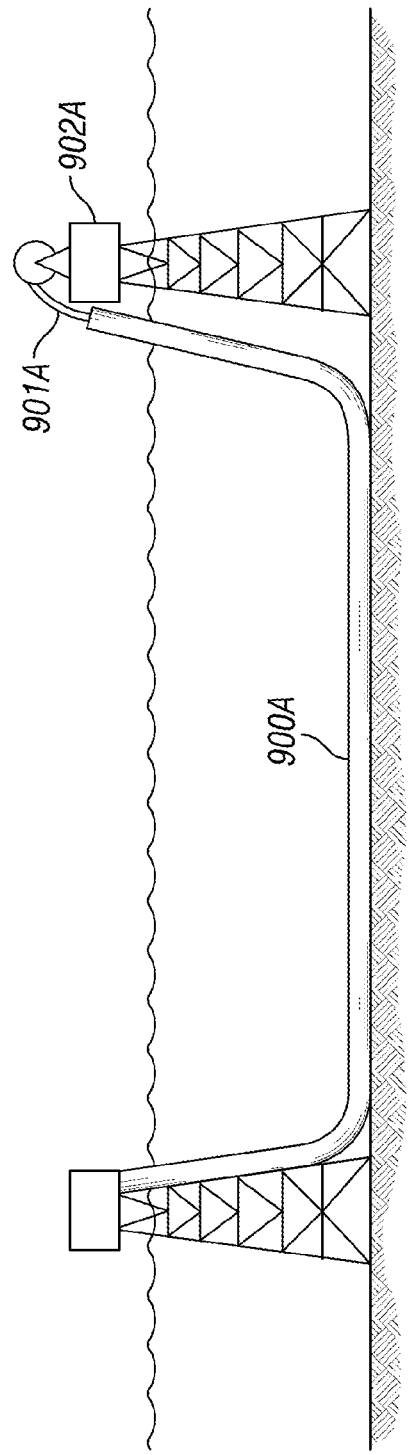

The EIP apparatus may be used for both new piping systems as well as the updating or retrofitting of an existing piping system. FIGS. 9, 9A and 9B illustrate embodiments of retrofitting an existing piping system with the engineered pipe-in-pipe apparatus. Retrofitting may be required for repair, improvements, re-rating or upgrade to replace an old, damaged, corroded or unfit existing pipe by inserting the inner engineered pipe into an existing outer pipe.

FIG. 9 illustrates an embodiment for retrofitting an onshore pipeline 900 by introducing engineered pipe 901 from an onshore station. The engineered pipe is initially stored in reels 903 or carousel.

FIG. 9A illustrates an embodiment for retrofitting an offshore pipeline 900 by introducing engineered pipe 901 from an installation vessel 902. The engineered pipe is initially stored in reels or carousels.

FIG. 9B illustrates an embodiment for retrofitting an offshore pipeline 900A by introducing engineered pipe 901A from a platform 902A. The engineered pipe is initially stored in reels or carousels.

While the methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A pipe-in-pipe apparatus for conveying fluids comprising:
   an outer pipe;
   an inner pipe disposed within the outer pipe wherein the inner pipe comprise an engineered pipe terminating in at least one end fitting wherein the end fitting further includes access between a bore of the inner pipe and the annulus; and
   an annulus between an outer wall of the inner pipe and an inner wall of the outer pipe.

2. The apparatus of claim 1 wherein the outer pipe is a rigid steel pipe.

3. The apparatus of claim 1 wherein the outer pipe is a second engineered pipe.

4. The apparatus of claim 1 wherein the engineered pipe is a bonded flexible pipe.

5. The apparatus of claim 1 where in the engineered pipe is an unbonded flexible pipe.

6. The apparatus of claim 1 wherein the engineered pipe is a composite pipe.

7. The apparatus of claim 1 wherein the engineered pipe is an umbilical.

8. The apparatus of claim 1 further comprising a direct electrical heating cable.

9. The apparatus of claim 1 further comprising a power cable.

10. The apparatus of claim 1 further comprising at least one heat trace device.

11. The apparatus of claim 1 further comprising a fiber optical cable.

12. The apparatus of claim 1 wherein the end fitting further includes access to the annulus.

13. The apparatus of claim 1 wherein the end fitting further includes access to a bore of the inner pipe.

14. The apparatus of claim 1 wherein the end fitting further includes at least one point of external access between a bore of the inner pipe, the annulus and at least one external source to allow an external agent to operate at least one controllable redirecting means to enable a flow path.

15. The apparatus of claim 5 wherein the end fitting further includes access to an annulus of the unbonded flexible pipe.

* * * * *